(12) United States Patent
Li et al.

(10) Patent No.: US 12,524,208 B2
(45) Date of Patent: Jan. 13, 2026

(54) CLOUD CODE DEVELOPMENT SYSTEM, METHOD, APPARATUS, DEVICE AND STORAGE MEDIUM

(71) Applicant: Beijing Baidu Netcom Science Technology Co., Ltd., Beijing (CN)

(72) Inventors: Yang Li, Beijing (CN); Yunpeng Peng, Beijing (CN); Zhiyue Guo, Beijing (CN); Xiaoyou Chen, Beijing (CN); Nanxi Zhang, Beijing (CN); Yujian Gao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 253 days.

(21) Appl. No.: 18/041,071

(22) PCT Filed: Jun. 20, 2022

(86) PCT No.: PCT/CN2022/099898
§ 371 (c)(1),
(2) Date: Feb. 8, 2023

(87) PCT Pub. No.: WO2023/093016
PCT Pub. Date: Jun. 1, 2023

(65) Prior Publication Data
US 2024/0264804 A1 Aug. 8, 2024

(30) Foreign Application Priority Data
Nov. 26, 2021 (CN) .......................... 202111422652.0

(51) Int. Cl.
*G06F 9/44* (2018.01)
*G06F 8/33* (2018.01)
(Continued)

(52) U.S. Cl.
CPC ............ *G06F 8/33* (2013.01); *G06F 9/45512* (2013.01); *G06F 9/45558* (2013.01);
(Continued)

(58) Field of Classification Search
CPC .... G06F 8/33; G06F 9/45512; G06F 9/45558; G06F 9/5038; G06F 9/5072; G06F 9/542
See application file for complete search history.

(56) References Cited

U.S. PATENT DOCUMENTS 10,007,509 B1    6/2018   Qureshi et al.
11,392,844 B1*   7/2022   Rao ..................... G06F 11/3698
(Continued)

FOREIGN PATENT DOCUMENTS

CN    103067502    4/2013
CN    103068402    4/2013
(Continued)

OTHER PUBLICATIONS

"Pseudoterminal—Wikipedia", Wikipedia, Feb. 10, 2021, https://web.archive.org/web/20210210205744/https://en.wikipedia.org/wiki/pseudoterminal. Accessed Nov. 24, 2023.
(Continued)

*Primary Examiner* — Hang Pan
(74) *Attorney, Agent, or Firm* — NORTON ROSE FULBRIGHT US LLP

(57) ABSTRACT

A cloud code development system, method, apparatus and device, which relate to the technical field of computer, in particular to for cloud code development and online coding technology is disclosed. The system include: a client including an Agent and a Remote-Server; the Remote-Server is configured to obtain a code input by a user, and synchronize the code input by the user to the cloud server through stream synchronization; the cloud server is configured to establish a coding virtual machine corresponding to the Remote-
(Continued)

S601 — obtaining a code input by a user, and synchronizing the code to a cloud server through stream synchronization S602 — pulling a task from the cloud server, wherein the task is generated by a coding virtual machine in the cloud server based on the code S603 — executing the task Server; write the code synchronized by the Remote-Server through stream synchronization into the virtual machine; run the code via the coding virtual machine to generate a corresponding task; the Agent is configured to pull the task from the cloud server and send the task to the Remote-Server; the Remote-Server being further configured to execute the task.

13 Claims, 4 Drawing Sheets

(51) Int. Cl.
    *G06F 9/455*           (2018.01)
    *G06F 9/50*             (2006.01)
    *G06F 9/54*             (2006.01)

(52) U.S. Cl.
    CPC ......... *G06F 9/5038* (2013.01); *G06F 9/5072* (2013.01); *G06F 9/542* (2013.01); *G06F 2009/45562* (2013.01)

(56) References Cited

U.S. PATENT DOCUMENTS

| | | | |
|---|---|---|---|
| 2005/0262475 A1* | 11/2005 | Halpern | G06F 8/71 717/114 |
| 2013/0346946 A1 | 12/2013 | Pinnix | |
| 2014/0089918 A1* | 3/2014 | Levon | G06F 9/45545 718/1 |
| 2015/0205587 A1 | 7/2015 | Bates et al. | |
| 2016/0154630 A1 | 6/2016 | Zang et al. | |
| 2017/0289007 A1* | 10/2017 | Shi | H04L 67/561 |
| 2018/0189369 A1* | 7/2018 | Baek | G06F 40/197 |
| 2019/0016419 A1* | 1/2019 | Sheldon-Coulson | G09C 1/00 |
| 2021/0089359 A1* | 3/2021 | Culp | G06F 9/468 |
| 2021/0096825 A1 | 4/2021 | Gray et al. | |

FOREIGN PATENT DOCUMENTS

| | | |
|---|---|---|
| CN | 107295045 | 10/2017 |
| CN | 110471654 | 11/2019 |
| CN | 110502212 | 11/2019 |
| CN | 111773691 | 10/2020 |
| CN | 112269570 | 1/2021 |
| CN | 113377363 | 9/2021 |
| CN | 114089974 | 2/2022 |

OTHER PUBLICATIONS

"WebSocket—Wikipedia", *Wikipedia*, Apr. 26, 2018, https://en.wikipedia.org/w/index.php?title=WebSocket&oldid=838373221. Accessed Jan. 11, 2019.

Extended European Search Report issued in corresponding European Application No. 22847526.5, dated Dec. 14, 2023.

Fylaktopoulos et al. "An overview of platforms for cloud based development", *Biomed Central*, vol. 5, No. 1, pp. 1-13, 2016.

Yi et al. "Characterizing developer behavior in cloud based IDEs", 2017 ACM/IEEE International Symposium on Empirical Software Engineering and Measurement, 2017, pp. 48-57, *IEEE*, DOI: 10.1109/ESEM.2017.27. Accessed Dec. 7, 2017.

Office Action issued in corresponding Chinese Application No. 202111422652.0, dated Apr. 15, 2023, 11 pages.

Notice of Allowance issued in counterpart Japanese Application No. 2023-50855, dated Jun. 7, 2022.

International Search Report Issued in Counterpart PCT Application No. PCT/CN2022/099898 dated Sep. 14, 2022 (no translation provided).

Notice of Allowance issued in corresponding Chinese Application No. 202111422652.0, dated Jul. 31, 2023 (English Translation provided).

Office Action issued in corresponding Korean Application No. 10-2023-7004782, dated Oct. 15, 2024 (No English translation provided).

\* cited by examiner

CLOUD CODE DEVELOPMENT SYSTEM, METHOD, APPARATUS, DEVICE AND STORAGE MEDIUM

CROSS REFERENCE TO RELATED APPLICATIONS

The present application is a national phase application under 35 U.S.C. § 371 of International Application No. PCT/CN2022/099898, filed Jun. 20, 2022, which claims the benefit of priority to Chinese patent application No. 202111422652.0 filed with the China National Intellectual Property Administration on Nov. 26, 2021 and entitled "Cloud code developing system, method, apparatus, device and storage medium", each of which are incorporated herein by reference in their entirety.

TECHNICAL FIELD

The present disclosure relates to the technical field of computer, in particular to a cloud code development and online coding technology.

BACKGROUND

Cloud code development provides cloud-integrated back-end cloud services. Compared with traditional front-end development models, cloud code development can provide complete back-end cloud services, including basic capabilities such as databases, storage, functions, and static hosting, which can greatly save front-end hardware resources, and with which users can even develop codes with high computing performance through smart phones. Along with the development of computer technology, code development is gradually split, from the original monolithic architecture model, into multiple service applications consisting of many loosely coupled and independently deployable smaller components or services. Cloud code development can be well adapted to collaborative development scenarios.

SUMMARY

The present disclosure provides a cloud code development system, method, apparatus, device and storage medium.

According to an aspect of the present disclosure, a cloud code development system is provided, which includes:
a client and a cloud server, wherein the client includes an Agent and a Remote-Server;
the Remote-Server is configured to obtain a code input by a user, and synchronize the code input by the user to the cloud server through stream synchronization;
the cloud server is configured to establish a coding virtual machine corresponding to the Remote-Server; write the code synchronized by the Remote-Server through the stream synchronization into the coding virtual machine; and run the code via the coding virtual machine to generate a corresponding task;
the Agent is configured to pull the task from the cloud server and send the task to the Remote-Server; and
the Remote-Server is further configured to execute the task.

According to another aspect of the present disclosure, a cloud code development method is provided, which is applied in a client, and the method includes:
obtaining a code input by a user, and synchronizing the code to a cloud server through stream synchronization;
pulling a task from the cloud server, wherein the task is generated by a coding virtual machine in the cloud server based on the code; and
executing the task.

According to another aspect of the present disclosure, a cloud code development method is provided, which is applied in a cloud server, and the method includes:
establishing a coding virtual machine;
writing a code synchronized through stream synchronization into the coding virtual machine; and
running the code via the coding virtual machine to generate a corresponding task.

According to another aspect of the present disclosure, a cloud code development apparatus is provided, which is applied to a client, and the apparatus comprises:
a Remote-Server, configured for obtaining a code input by a user, and synchronizing the code to a cloud server through stream synchronization;
an Agent, configured for pulling a task from the cloud server and sending the task to the Remote-Server; wherein, the task is generated by a coding virtual machine in the cloud server based on the code; and
the Remote-Server is further configured for executing the task.

According to another aspect of the present disclosure, a cloud code development apparatus is provided, which is applied to a cloud server, and the apparatus comprises:
a virtual machine establishing module, configured for establishing a coding virtual machine;
a code synchronizing module, configured for writing a code synchronized through stream synchronization into the coding virtual machine; and
a task generating module, configured for running the code via the coding virtual machine to generate a corresponding task.

According to another aspect of the present disclosure, an electronic device is provided, which includes:
at least one processor; and
a memory communicated with the at least one processor; wherein,
the memory stores instructions executable by the at least one processor that, when executed by the at least one processor, cause the at least one processor to implement any one of the cloud code development methods described in the present disclosure.

According to another aspect of the present disclosure, a non-transitory computer-readable storage medium having stored thereon computer instructions is provided, wherein the computer instructions are used to cause the computer to implement any one of the cloud code development methods described in the present disclosure.

According to another aspect of the present disclosure, a computer program product is provided, which includes a computer program, and when the computer program is executed by a processor, causes the processor to implement any one of cloud code development methods described in the present disclosure.

In the embodiments of the present disclosure, the cloud code development is realized, and compared with the synchronization mode of code files, the stream synchronization mode can increase the consistency of code in the client and cloud server, thus improving the response speed of the cloud code development.

It should be understood that the content described in this section is not intended to identify key or important features of the embodiments of the present disclosure, nor is it intended to limit the scope of the present disclosure. Other features of the present disclosure will be readily understood through the following description.

BRIEF DESCRIPTION OF DRAWINGS

In order to illustrate the technical solutions of the embodiments of the present invention and of the prior art more clearly, the accompanying drawings that need to be used in the embodiments and the prior art are briefly introduced above. Obviously, the accompanying drawings in the following description are only for some of the embodiments of the present invention, those skilled in the art can also obtain other drawings based on these drawings without creative effort.

DETAILED DESCRIPTION OF EMBODIMENTS

Exemplary embodiments of the present disclosure are described below in conjunction with the accompanying drawings, which include various details of the embodiments of the present disclosure to facilitate understanding, and they should be regarded as illustrative only. Accordingly, those of ordinary skill in the art will recognize that various changes and modifications of the embodiments described herein can be made without departing from the scope and spirit of the disclosure. Also, descriptions of well-known functions and constructions are omitted in the following description for clarity and conciseness.

In the related cloud code development technology, IDE (Integrated Development Environment) is used locally on a client to obtain a code input by a user. After the code file compiled by the user is completed, the code file is synchronized to the cloud server through Samba (information service block) or FTP (File Transfer Protocol). The cloud server updates the local code file of the cloud server according to the code file sent by the client, so as to realize cloud code development. However, using the above method, there will be problems such as slow code file access speed, slow index establishment, slow search speed, and poor security, and the advanced functions of the IDE, such as Intelligence (intelligent prompt) functions, cannot be used.

Figure 1:
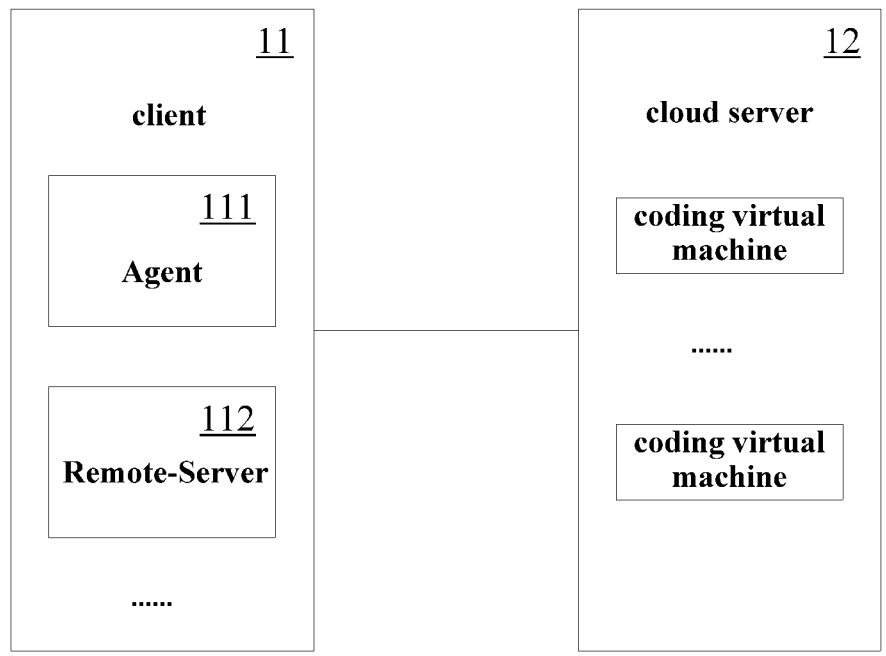
FIG. 1 is a schematic view according to a first embodiment of the present disclosure.

In view of this, an embodiment of the present disclosure provides a cloud code development system, as shown in FIG. 1, comprising:

a client 11 and a cloud server 12, wherein the client 11 comprises an Agent 111 and a Remote-Server 112;

the Remote-Server 112 is configured to obtain a code input by a user, and synchronize the code to the cloud server through stream synchronization;

the cloud server 12 is configured to establish a coding virtual machine corresponding to the Remote-Server; write the code synchronized by the Remote-Server through stream synchronization into the virtual machine; run the code via the coding virtual machine to generate a corresponding task;

the Agent 111 is configured to pull the task from the cloud server and send the task to the Remote-Server 112;

the Remote-Server112 is further configured to execute the task.

An Agent and a Remote-Server are installed in the client, and a coding virtual machine corresponding to Remote-Server is established in the cloud server. Remote-Server obtains the code input by the user in the client, and synchronizes the code to the corresponding coding virtual machine in the cloud server through stream synchronization. The coding virtual machine executes the received code and generates a corresponding task. The Agent pulls a task from the coding virtual machine of the cloud server and sends it to the Remote-Server for execution. The above task may be an advanced function task of the IDE, such as code jump, code auto-completion, code hover prompt, and the like.

Different from the code file synchronization in the related technology, Remote-Server in the embodiment of the present disclosure adopts the method of stream synchronization to realize the code synchronization with the cloud server. Remote-Server directly synchronizes the code input by the user (including code deletion, overwriting, etc.) to the coding virtual machine of the cloud server in the form of data flow, instead of synchronizing to the cloud server in the form of code file after the code file is written. In this way, the code of the cloud server is strongly consistent with the local code in the client, and the code access speed is fast, the index establishment is fast, and the search speed is fast. Furthermore, Agent pulls a task from the cloud server to Remote-Server for execution, which can realize the advanced functions of using the IDE, such as code jump, code auto-completion, code hover prompts and other functions.

In an example, the cloud server can apply the cloud code development system of the embodiment of the disclosure to a host that requires remote operation, which can make the experience of cloud code development consistent with the local experience, enable remote operations on any host that needs to be operated, support operations such as debugging and compiling cloud programs, and thus realizing unified management of multiple hosts.

The cloud server can realize code execution by means of a pseudo-terminal. In a possible implementation, the Remote-Server is specifically configured to: establish a terminal emulator; obtain the code input by the user through the terminal emulator; send the code to the coding virtual machine of the cloud server by means of real-time full-duplex synchronous communication.

The cloud server is specifically configured to: input the received code into a master pseudo terminal of the coding virtual machine, block a file descriptor of the master pseudo terminal, map the code to a slave pseudo terminal through the master pseudo terminal, and input the code into a command processor of the coding virtual machine through the slave pseudo terminal.

Figure 2:
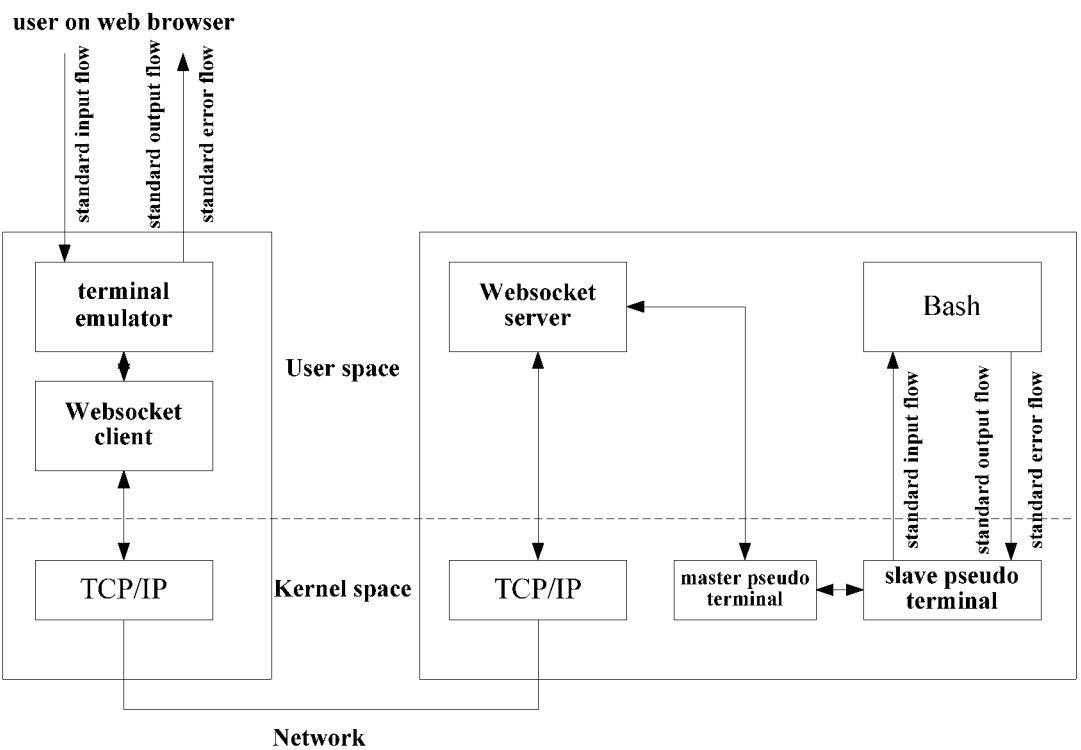
FIG. 2 is a schematic view according to a second embodiment of the present disclosure.

In an example, Remote-Server may be an IDE developed based on VS code (Visual Studio Code, a source code editor). Remote-Server can call the remote fork-pty function to establish a pseudo-terminal in the virtual machine. The fork-pty function first calls the openpty function to obtain an available master pseudo terminal. If the master pseudo terminal is obtained successfully, a new process is created. This process will close the file descriptor of the master pseudo terminal, and then call the login_tty function to start the slave pseudo terminal in the coding virtual machine, map the code input by the user to the slave pseudo terminal through the master pseudo terminal. The slave pseudo terminal inputs the code to the command processor of the coding virtual machine, so as to realize the execution of the code, as shown in FIG. 2, where TCP/IP is the network connection protocol, Bash represents the command processor of the coded virtual machine, and Websocket is a full-duplex communication protocol.

In the embodiment of the present disclosure, the code input by the user is obtained through the terminal emulator, and the code collected by the terminal emulator is sent to the master pseudo terminal by means of real-time full-duplex synchronous communication, and the file descriptor of the master pseudo terminal is blocked. The master pseudo terminal is not responsible for the execution of the code, the code input by the master pseudo terminal is mapped to the slave pseudo terminal. The slave pseudo terminal inputs the code to the command processor of the coding virtual machine, so as to realize the running of the code. In this disclosure, code synchronization is carried out in the form of data flow, the cloud server and the local code of the client are strongly consistent, the code access speed is fast, the index establishment is fast, and the search speed is fast.

When using the client for cloud code development for the first time, Agent and Remote-Server need to be installed in the client. In an example, Agent is firstly installed in the client. After Agent is installed, Remote-Server can be installed locally in the client by using Agent. During the process of locally installing Remote-Server in the client, Agent can also send a request to the cloud server, so as to establish a coding virtual machine corresponding to Remote-Server on the cloud server.

Figure 3:
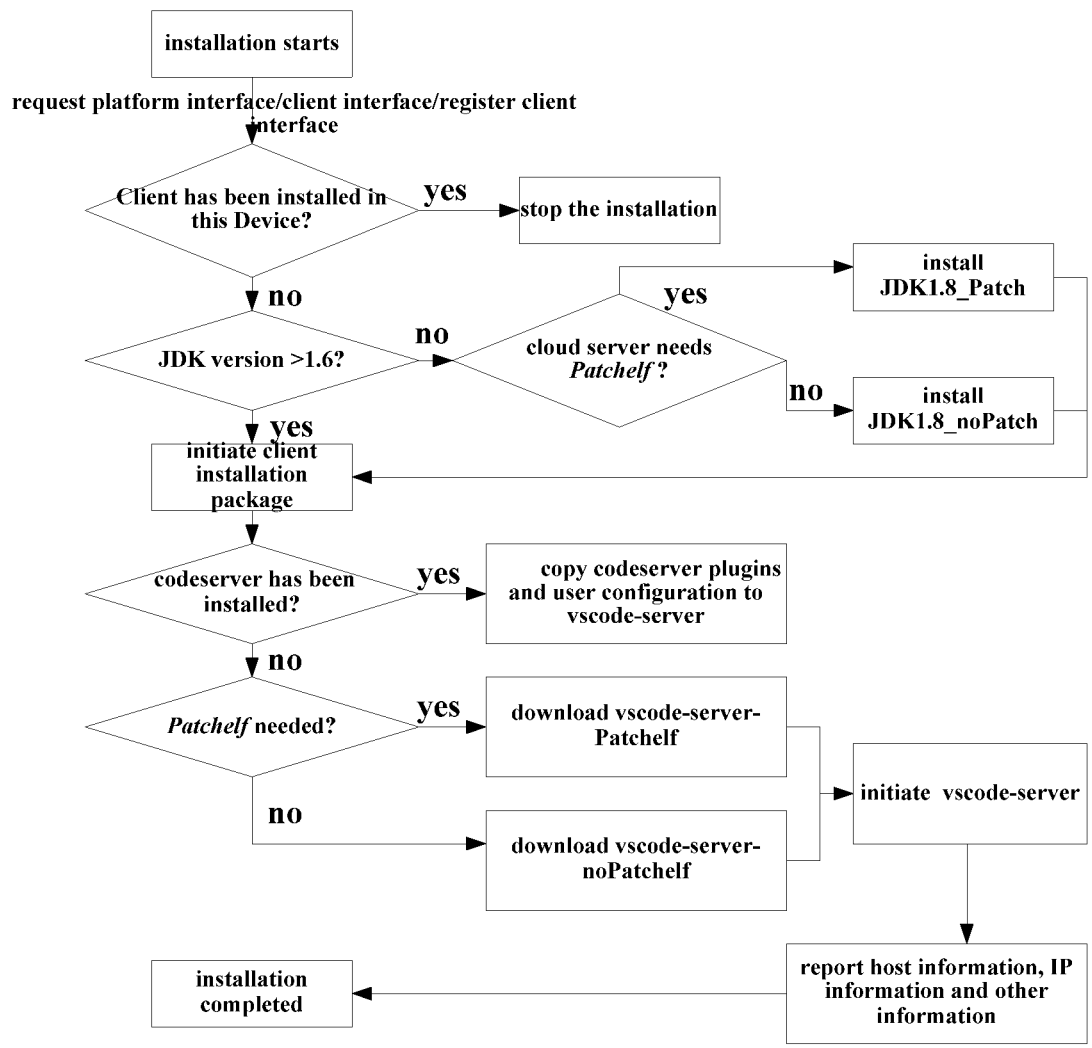
FIG. 3 is a schematic view according to an Agent installation method of the present disclosure.

In an example, the installation process of Agent can be shown in FIG. 3. After starting the installation, the Platform interface, the Agent interface, and the Registe Agent (registered client) interface are first requested to perform an initialization operation. It is determined whether Agent has been installed in the current device, and if so, stop the installation; otherwise, check the installation environment. First, it is determined whether the version of the client's local JDK (Java Development Kit, a software development kit) is higher than the required version (version 1.6 is used as an example in the figure). If not, it is determined whether the cloud server needs Patchelf (A tool for modifying dynamic libraries and executable programs). If the cloud server needs Patchelf, the JDK corresponding to a first version (JDK1.8_Patch as an example) is installed; if the cloud server does not need Patchelf, the JDK corresponding to a second version (JDK1.8_noPatch as an example) is installed. If the local JDK version of the client is higher than the required version, the Agent software package (client installation package) is initiated to determine whether a codeserver (code server) has been installed in the client. If the codeserver has been installed in the client, the codeserver plug-in and its user configuration is copied into vscode-server. If the codeserver has not been installed in the client, then it is determined whether Patchelf is needed; if so, vscode-server-Patchelf is downloaded, if not, then vscode-server-noPatchelf is downloaded. Vscode-server is started to report Host information, IP information and other information to complete the installation.

After Agent is installed, the user can use Agent to manage the client's local Remote-Server and the coding virtual machine in the cloud server. In a possible implementation, the Agent is further configured to: perform management for the Remote-Server and the coding virtual machine corresponding to the Remote-Server, wherein the management includes at least one of upgrading, backtracking, restarting, deleting, adding and status checking.

The management of Remote-Server and the coding virtual machine by Agent may include at least one of upgrading, backtracking, restarting, deleting, adding and status checking. In an example, taking the addition of Remote-Server and the coding virtual machine as an example, the user can create Remote-Server locally in the client through Agent, and Agent will register the Remote-Server to the cloud server. When the cloud server receives the registration information for the Remote-Server, a coding virtual machine corresponding to the Remote-Server will be established accordingly. In an example, taking the backtracking of Remote-Server and the coding virtual machine as an example, when the user wants to backtrack the code to a certain point in time, the user sends a backtracking command for the coding virtual machine to the cloud server through Agent, and the data necessary for the backtracking of the coding virtual machine (such as the image of the coding virtual machine or the like) is stored in the cloud server. The cloud server uses the data to backtrack the coding virtual machine, and a corresponding backtracking task will be generated after the coding virtual machine backtracks. Agent pulls the backtracking task to the Remote-Server for execution, so as to realize the backtracking of Remote-Server.

In the embodiment of the present disclosure, Agent can be used to manage the client's local Remote-Server and the coding virtual machine in the cloud server, which is convenient for the management of Remote-Server and the cloud server. Agent can be used to realize the upgrading, backtracking, restarting, deleting, adding, and status checking of Remote-Server and the cloud server, thus improving the usability of cloud code development.

In a possible implementation, the Agent is specifically configured to: periodically send a heartbeat request to the coding virtual machine, and determine that the coding virtual machine is available after receiving response information from the coding virtual machine; determine, when no response information from the coding virtual machine is received within a continuous preset number of cycles, that the coding virtual machine is unavailable and send recovery information for the coding virtual machine to the cloud server;

the cloud server is further configured to send response information to the client by using the coding virtual machine responding to the heartbeat request; and restore the coding virtual machine in response to the recovery information.

Figure 4:
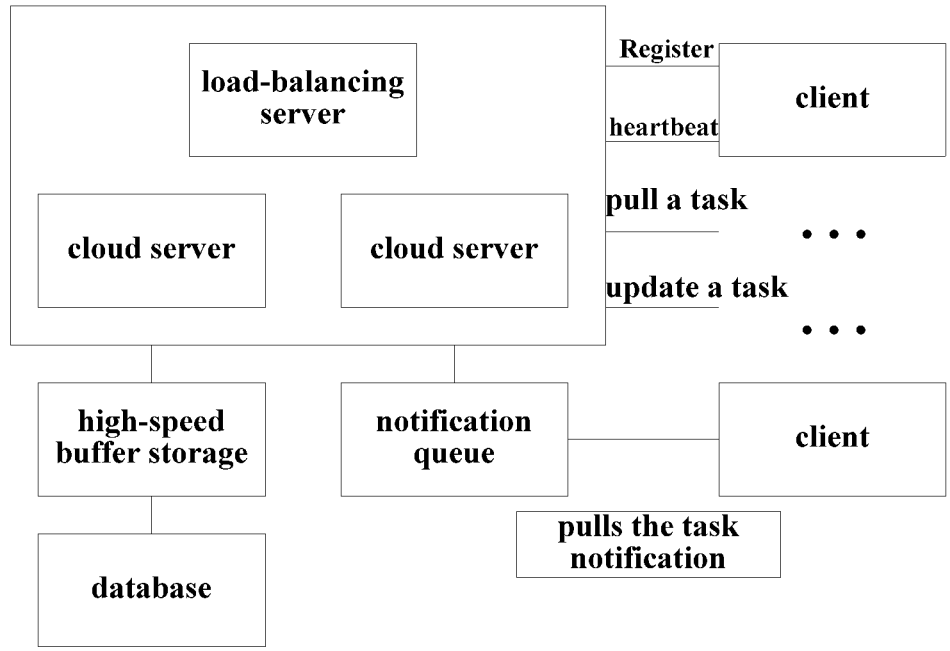
FIG. 4 is a schematic view according to a third embodiment of the present disclosure.

In an example, Agent can adopt a Client-server architecture design. For example, as shown in FIG. 4, after the installation of Agent in the client is completed, Agent first registers in the cloud server to obtain legal access and control rights. After successfully installing Remote-Server and the coding virtual machine, Agent can periodically send a heartbeat request to the coding virtual machine. After receiving the response information from the coding virtual machine with respect to the heartbeat request, it determines that the coding virtual machine is available. If no response information from the coding virtual machine is received for a continuous preset number of cycles (the preset number can be customized according to the actual situation, for example, 3 times, 4 times or 5 times, etc.), Agent determines that the coding virtual machine is abnormal. Agent can send recovery information indicating recovery of the abnormal coding virtual machine to the cloud server. The cloud server restores the corresponding coding virtual machine after receiving the recovery information. In an example, the cloud server can restore the unavailable coding virtual machine by restarting or migrating, so as to ensure the sequential process of cloud code development. The cloud server can first try to restart the coding virtual machine. If the coding virtual machine fails to restart due to the host machine of the coding virtual machine, the image file of the coding virtual machine can be used to re-establish the coding virtual machine on an available host machine, and the corresponding relationship between the newly established coding virtual machine and Remote-Server can be remapped to enable migration of coding virtual machines.

In the embodiment of the present disclosure, Agent can use the heartbeat request to obtain the status of the coding virtual machine in the cloud server, and recover the unavailable coding virtual machine by the recovery information, so as to ensure the sequential process of cloud code development and improve the availability of cloud code development.

In a possible implementation, the cloud server is further configured to add task notification of the task to a notification queue using the coding virtual machine;
the Agent is specifically configured to pull task notification from the notification queue of the coding virtual machine, pull the task from the coding virtual machine based on the task notification, and send the task to the Remote-Server; obtain task execution status of the Remote-Server, and send the task execution status to the coding virtual machine;
the cloud server is further configured to update the task in the coding virtual machine using the coding virtual machine based on the task execution status.

In an example, as shown in FIG. 4, the coding virtual machine generates a corresponding task during the process of executing the code, for example, the task may be code jump, code auto-completion, code hover prompt, and the like. The coding virtual machine can add the task notification of the task to the notification queue, and Agent can obtain the task notification from the notification queue, and based on the task notification, pull the task from the coding virtual machine to the client's local Remote-Server for execution. After Remote-Server finishes executing the task, Agent can update the tasks in the coding virtual machine according to the task execution status of Remote-Server.

In the embodiment of the present disclosure, the coding virtual machine adds the task notification of the task to the notification queue. Agent pulls the task notification from the notification queue, which facilitates Agent to obtain the task notification. Agent pulls the task based on the task notification. Compared to pulling a task directly from the task queue, it makes it easier for Agent to manage tasks and ultimately improve task execution efficiency. In addition, Agent returns the task execution status to the coding virtual machine, so that the coding virtual machine can update its tasks in real time according to the task execution status, which facilitates the management and execution of tasks, and ultimately improves the efficiency of task execution.

Figure 5:
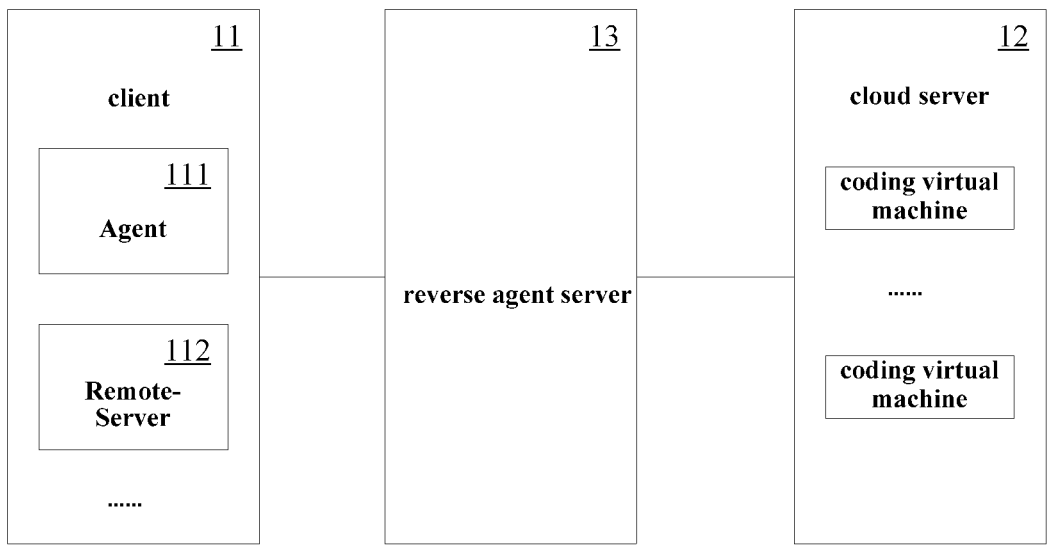
FIG. 5 is a schematic view according to a fourth embodiment of the present disclosure.

In order to further increase the safety performance of cloud code development, in a possible implementation, in reference to FIG. 5, the system further comprises: a reverse agent server 13 configured to forward data messages between the client and the cloud server.

The reverse agent server provides the agent service of the cloud server. In an example, the reverse agent server can be Nginx (also called Enginex, which is a high performance reverse agent web server). All services provided by the cloud server will be loaded onto the reverse agent server. What is exposed externally is an address of the reverse agent server. The address of the cloud server is not directly exposed to the Internet. Therefore, the safety of the cloud server can be increased. In addition, the reverse agent server also plays a role of load balancing and data forwarding, which can improve load balance between cloud servers and ensure accurate data forwarding.

Figure 6:
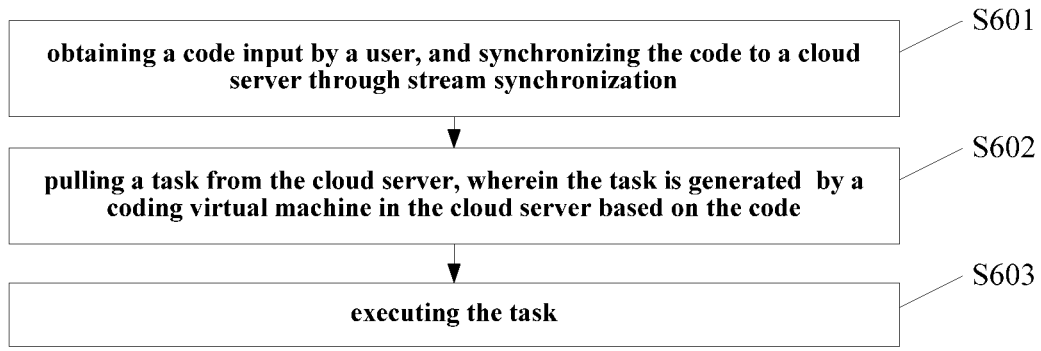
FIG. 6 is a schematic view of a cloud code development method applied to a client according to the present disclosure.

An embodiment of the present disclosure further provides a cloud code development method applied to a client. In reference to FIG. 6, the method includes:
S601, obtaining a code input by a user, and synchronizing the code to a cloud server through stream synchronization;
S602, pulling a task from the cloud server, wherein the task is generated by a coding virtual machine in the cloud server based on the code;
S603, executing the task.

In a possible implementation, obtaining a code input by a user, and synchronizing the code to a cloud server through stream synchronization, includes:
establishing a terminal emulator, and obtaining the code input by the user through the terminal emulator;
sending the code to the coding virtual machine of the cloud server by means of real-time full-duplex synchronous communication.

In a possible implementation, the method further includes:
periodically sending a heartbeat request to the coding virtual machine;
determining that the coding virtual machine is available after receiving response information from the coding virtual machine;
determining, when no response information from the coding virtual machine is received within a continuous preset number of cycles, that the coding virtual machine is unavailable and sending recovery information for the coding virtual machine to the cloud server.

In a possible implementation, pulling a task from the cloud server includes:
pulling a task notification from a notification queue of the coding virtual machine;
pulling the task from the coding virtual machine based on the task notification;
the method further includes:
obtaining task execution status of the task, and sending the task execution status to the coding virtual machine.

Figure 7:
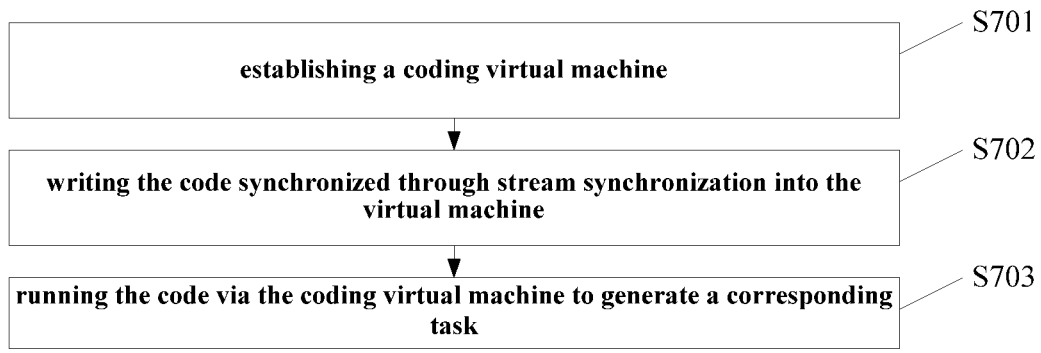
FIG. 7 is a schematic view of a cloud code development method applied to a cloud server according to the present disclosure.

An embodiment of the present disclosure further provides a cloud code development method applied to a cloud server. In reference to FIG. 7, the method includes:
S701, establishing a coding virtual machine;
S702, writing the code synchronized through stream synchronization into the virtual machine;
S703, running the code via the coding virtual machine to generate a corresponding task.

In a possible implementation, writing the code synchronized through stream synchronization into the virtual machine includes:
inputting the received code into a master pseudo terminal of the coding virtual machine, blocking a file descriptor of the master pseudo terminal, mapping the code to a slave pseudo terminal through the master pseudo terminal, and inputting the code into a command processor of the coding virtual machine through the slave pseudo terminal.

In a possible implementation, the method further includes:
sending, via the coding virtual machine, response information to a client by responding to a heartbeat request sent by the client; and
restoring the coding virtual machine in response to recovery information representing restoration of the coding virtual machine.

In a possible implementation, the method further includes:
adding, via the coding virtual machine, a task notification of the task to a notification queue; and
updating, via the coding virtual machine, the task in the coding virtual machine based on a task execution status sent by a client.

An embodiment of the present disclosure further provides a cloud code development apparatus applied to a client, the apparatus including:
a Remote-Server, configured for obtaining a code input by a user, and synchronizing the code to a cloud server through stream synchronization;
an Agent, configured for pulling a task from the cloud server and sending the task to the Remote-Server; wherein, the task is generated by a coding virtual machine in the cloud server based on the code; and
the Remote-Server is further configured for executing the task.

In a possible implementation, the Remote-Server is specifically configured for: establishing a terminal emulator; obtaining the code input by the user through the terminal emulator; sending the code to the coding virtual machine of the cloud server by means of real-time full-duplex synchronous communication.

In a possible implementation, the Agent is further configured for: performing management for the Remote-Server and the coding virtual machine corresponding to the Remote-Server, wherein the management includes at least one of upgrading, backtracking, restarting, deleting, adding and status checking.

In a possible implementation, the Agent is further configured for: periodically sending a heartbeat request to the coding virtual machine, and determining that the coding virtual machine is available after receiving response information from the coding virtual machine; determining that, when no response information from the coding virtual machine is received within a continuous preset number of cycles, the coding virtual machine is unavailable and sending recovery information for the coding virtual machine to the cloud server.

In a possible implementation, the Agent is further configured for: pulling a task notification from a notification queue of the coding virtual machine, pulling the task from the coding virtual machine based on the task notification, and sending the task to the Remote-Server; obtaining task execution status of the Remote-Server, and sending the task execution status to the coding virtual machine in the cloud server.

An embodiment of the present disclosure further provides a cloud code development apparatus applied to a cloud server, the apparatus including:
a virtual machine establishing module, configured for establishing a coding virtual machine;
a code synchronizing module, configured for writing a code synchronized through stream synchronization into the virtual machine;
a task generating module, configured for running the code via the coding virtual machine to generate a corresponding task.

In a possible implementation, the code synchronizing module is specifically configured for: inputting the received code into a master pseudo terminal of the coding virtual machine, blocking a file descriptor of the master pseudo terminal, mapping the code to a slave pseudo terminal through the master pseudo terminal, and inputting the code into a command processor of the coding virtual machine through the slave pseudo terminal.

In a possible implementation, the apparatus further includes:
a heartbeat response module, configured for sending, via the coding virtual machine, response information to a client by responding to a heartbeat request sent by the client; and
a virtual machine restoring module, configured for restoring the coding virtual machine in response to recovery information representing restoration of the coding virtual machine.

In a possible implementation, the apparatus further includes:
a task notification adding module, configured for adding, via the coding virtual machine, a task notification of the task to a notification queue; and
a task updating module, configured for updating, via the coding virtual machine, the task in the coding virtual machine based on a task execution status sent by a client.

In the technical solutions of the present disclosure, the collection, storage, use, processing, transmission, provision, and disclosure of a user's personal information involved comply with the requirements of relevant laws and regulations and do not violate public order or moral standards.

According to an embodiment of the present disclosure, the present disclosure further provides an electronic device, a readable storage medium, and a computer program product.

In this embodiment, the electronic device includes:
at least one processor; and
a memory communicated with the at least one processor; wherein,
the memory stores instructions executable by the at least one processor that, when executed by the at least processor, cause the at least one processor to implement any cloud code development method described in the present application.

The computer program product includes a computer program that, when executed by a processor, implements any cloud code development method described in the present application.

Figure 8:
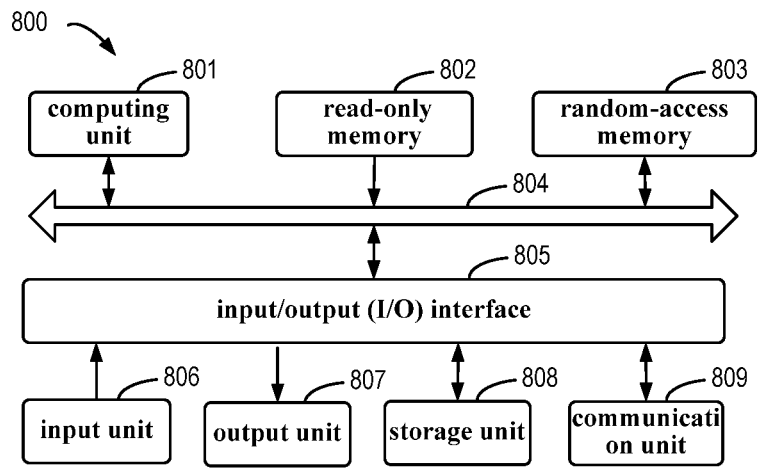
FIG. 8 is a block diagram of an electronic device used to implement the cloud code development method according to an embodiment of the present disclosure.

FIG. 8 shows a schematic block diagram of an example electronic device 800 that may be used to implement embodiments of the present disclosure. Electronic device is intended to represent various forms of digital computers, such as laptops, desktops, workstations, personal digital assistants, servers, blade servers, mainframes, and other suitable computers. Electronic device may also represent various forms of mobile apparatuses, such as personal digital processing, cellular telephones, smart phones, wearable apparatuses, and other similar computing apparatuses. The components shown herein, their connections and relationships, and their functions, are by way of example only, and are not intended to limit implementations of the disclosure described and/or claimed herein.

As shown in FIG. 8, the device 800 comprises a computing unit 801 that can execute various appropriate actions and treatments according to a computer program stored in a read-only memory (ROM) 802 or loaded from a storage unit 808 into a random-access memory (RAM) 803. In the RAM 803, various programs and data necessary for the operation of the device 800 can also be stored. The computing unit 801, ROM 802, and RAM 803 are connected to each other through a bus 804. An input/output (I/O) interface 805 is also connected to bus 804.

Multiple components in the device 800 are connected to the I/O interface 805, including: an input unit 806, such as a keyboard, a mouse, and the like; an output unit 807, such as various types of displays, speakers, or the like; a storage unit 808, such as a magnetic disk, an optical disk, and the like; and a communication unit 809, such as a network card, a modem, a wireless communication transceiver, and the like. The communication unit 809 allows the device 800 to exchange information/data with other devices over a computer network such as the Internet and/or various telecommunication networks.

The computing unit 801 may be various general-purpose and/or special-purpose processing components having processing and computing capabilities. Some examples of computing units 801 include, but are not limited to, central processing units (CPUs), graphics processing units (GPUs), various dedicated artificial intelligence (AI) computing chips, various computing units that run machine learning model algorithms, digital signal processing processor (DSP), and any suitable processor, controller, micro-controller, and the like. The computing unit 801 executes various methods and processes described above, such as cloud code development methods. For example, in some embodiments, the cloud code development methods may be implemented as a computer software program tangibly embodied in a machine-readable medium, such as the storage unit 808. In some embodiments, part or all of the computer program may be loaded and/or installed onto the apparatus 800 via the ROM 802 and/or the communication unit 809. When the computer program is loaded into the RAM 803 and executed by the computing unit 801, one or more steps of the cloud code development methods described above can be performed. Alternatively, in other embodiments, the computing unit 801 may be configured in any other appropriate way (for example, by means of firmware) to execute the cloud code development methods.

Various implementations of the systems and techniques described above herein can be implemented in digital electronic circuit systems, integrated circuit systems, field programmable gate arrays (FPGAs), application specific integrated circuits (ASICs), application specific standard products (ASSPs), system-on-chip System of System (SOC), Complex Programmable Logic Device (CPLD), computer hardware, firmware, software, and/or combinations thereof. These various embodiments may include being implemented in one or more computer programs that can be executed and/or interpreted on a programmable system including at least one programmable processor, the programmable processor can be special-purpose or general-purpose programmable processor, can receive data and instruction from storage system, at least one input apparatus, and at least one output apparatus, and transmit data and instruction to the storage system, the at least one input apparatus, and the at least one output apparatus.

Program codes for implementing the methods of the present disclosure may be written in any combination of one or more programming languages. These program codes can be provided to a processor or controller of a general-purpose computer, a special-purpose computer, or other programmable data processing apparatuses, so that the program codes, when executed by the processor or controller, cause the functions/operations specified in the flow diagrams and/or block diagrams to be implemented. The program code may execute entirely on the machine, partly on the machine, as a stand-alone software package partly on the machine and partly on a remote machine or entirely on the remote machine or server.

In the context of the present disclosure, a machine-readable medium may be a tangible medium that may contain or store a program for use by or in conjunction with an instruction execution system, apparatus, or device. A machine-readable medium may be a machine-readable signal medium or a machine-readable storage medium. A machine-readable medium may include, but is not limited to, electronic, magnetic, optical, electromagnetic, infrared, or semiconductor systems, apparatus, or device, or any suitable combination of the foregoing. More specific examples of machine-readable storage medium would include one or more wire-based electrical connections, portable computer disks, hard disks, Random Access Memory (RAM), Read Only Memory (ROM), Erasable Programmable Read Only Memory (EPROM or flash memory), fiber optics, compact disk read-only memory (CD-ROM), optical storage apparatuses, magnetic storage apparatuses, or any suitable combination of the foregoing.

To provide for interaction with the user, the systems and techniques described herein can be implemented on a computer having a display apparatus (e.g., a CRT (cathode ray tube) or LCD (liquid crystal display) monitor) for displaying information to the user; and a keyboard and pointing apparatus (e.g., a mouse or a trackball) through which the user can provide input to the computer. Other kinds of apparatuses may also be used to provide interaction with the user; for example, the feedback provided to the user may be any form of sensory feedback (e.g., visual feedback, auditory feedback, or tactile feedback); and may be in any form (including acoustic input, voice input, or tactile input) to receive input from the user.

The systems and techniques described herein can be implemented on a computing system that includes back-end components (e.g., as a data server), or a computing system that includes middleware components (e.g., an application server), or a computing system that includes front-end components (e.g., a user computer having a graphical user interface or web browser through which a user can interact with modes of realization of the systems and techniques described herein), or any combination including such back-end components, middleware components, front-end components in a computing system. The components of the system can be interconnected by any form or medium of digital data communication (e.g., a communication network). Examples of communication networks include: Local Area Networks (LANs), Wide Area Networks (WANs), and the Internet.

A computer system may include a client and a server. The Client and server are generally remote from each other and typically interact through a communication network. The relationship of client and server arises by computer programs running on the respective computers and having a client-server relationship to each other. The server can be a cloud server, a server of a distributed system, or a server combined with a block chain.

It should be understood that steps may be reordered, added or deleted using the various forms of flow shown above. For example, each step described in the present disclosure may be executed in parallel, sequentially, or in a different order, as long as the desired result of the technical solution disclosed in the present disclosure can be achieved, which is not limited herein.

The specific modes of realization described above do not limit the protection scope of the present disclosure. It should be apparent to those skilled in the art that various modifications, combinations, sub-combinations and substitutions may be made depending on design requirements and other factors. Any modifications, equivalent replacements and improvements made within the spirit and principles of the present disclosure shall fall within the protection scope of the present disclosure.

The invention claimed:

1. A cloud code development system, comprising:
a client and a cloud server, wherein the client comprises an Agent and a Remote-Server, each of the client and the cloud server is a digital computer or a mobile apparatus;
the Remote-Server is configured to obtain a code input by a user, and synchronize the code input by the user to the cloud server through stream synchronization;
the cloud server is configured to establish a coding virtual machine corresponding to the Remote-Server; write the code synchronized by the Remote-Server through the stream synchronization into the coding virtual machine; and run the code via the coding virtual machine to generate a corresponding task, wherein the task comprises at least one of code jump, code auto-completion, code hover prompts, which are advanced function tasks of an Integrated Development Environment (IDE);
the Agent is configured to pull the task from the cloud server and send the task to the Remote-Server; and
the Remote-Server is further configured to execute the task;
wherein the cloud server is further configured to add, via the coding virtual machine, a task notification of the task to a notification queue;
the Agent is specifically configured to pull the task notification from the notification queue of the coding virtual machine, pull the task from the coding virtual machine based on the task notification, and send the task to the Remote-Server; obtain a task execution status of the Remote-Server, and send the task execution status to the coding virtual machine; and
the cloud server is further configured to update, via the coding virtual machine, the task in the coding virtual machine based on the task execution status.

2. The system according to claim 1, wherein, the Remote-Server is specifically configured to: establish a terminal emulator; obtain the code input by the user through the terminal emulator; send the code to the coding virtual machine of the cloud server by means of real-time full-duplex synchronous communication;
the cloud server is specifically configured to: input the received code into a master pseudo terminal of the coding virtual machine, block a file descriptor of the master pseudo terminal, map the code to a slave pseudo terminal by the master pseudo terminal, and input the code into a command processor of the coding virtual machine by the slave pseudo terminal.

3. The system according to claim 1, wherein the Agent is further configured to:
perform management for the Remote-Server and the coding virtual machine corresponding to the Remote-Server, wherein the management comprises at least one of upgrading, backtracking, restarting, deleting, adding and status checking.

4. The system according to claim 1, wherein the Agent is specifically configured to: periodically send a heartbeat request to the coding virtual machine, and determine that the coding virtual machine is available after receiving response information from the coding virtual machine;
determine, when receiving no response information from the coding virtual machine within a continuous preset number of cycles, that the coding virtual machine is unavailable and send recovery information for the coding virtual machine to the cloud server;
the cloud server is further configured to send, via the coding virtual machine, the response information to the client by responding to the heartbeat request; and restore the coding virtual machine in response to the recovery information.

5. The system according to claim 1, wherein the system further comprises: a reverse agent server, configured to forward a data message between the client and the cloud server.

6. A cloud code development method, which is applied in a client comprising an Agent and a Remote-Server, and the client being a digital computer or a mobile apparatus, comprising:
obtaining, via the Remote-Server, a code input by a user, and synchronizing the code to a cloud server through stream synchronization such that the cloud server establishes a coding virtual machine corresponding to the Remote-Server; writes the code synchronized by the Remote-Server through the stream synchronization into the coding virtual machine; and runs the code via the coding virtual machine to generate a corresponding task;
pulling, via the Agent, the task from the cloud server and sending the task to the Remote-Server, wherein the task is generated by the coding virtual machine in the cloud server based on the code, wherein the task comprises at least one of code jump, code auto-completion, code hover prompts, which are advanced function tasks of an Integrated Development Environment (IDE); and
executing, via the Remote-Server, the task;
wherein, pulling, via the Agent, the task from the cloud server comprises:
pulling a task notification of the task from a notification queue of the coding virtual machine, wherein the task notification is added to the notification queue via the coding virtual machine; and
pulling the task from the coding virtual machine based on the task notification;
the method further comprises:
sending, via the Agent, the task to the Remote-Server; obtaining, via the Agent, a task execution status of the Remote-Server, and sending the task execution status to the coding virtual machine such that the coding virtual machine updates the task in the coding virtual machine based on the task execution status.

7. The method according to claim 6, wherein obtaining the code input by the user, and synchronizing the code to the cloud server through the stream synchronization comprises:
establishing a terminal emulator and obtaining the code input by the user through the terminal emulator; and sending the code to the coding virtual machine of the cloud server by means of real-time full-duplex synchronous communication.

8. The method according to claim 6, the method further comprises:
   periodically sending a heartbeat request to the coding virtual machine;
   determining that the coding virtual machine is available after receiving response information from the coding virtual machine;
   determining, when no response information from the coding virtual machine is received within a continuous preset number of cycles, that the coding virtual machine is unavailable and sending recovery information for the coding virtual machine to the cloud server.

9. An electronic device, comprising:
   at least one processor; and
   a memory communicated with the at least one processor; wherein,
   the memory stores instructions executable by the at least one processor that, when executed by the at least one processor, cause the at least one processor to implement the method of claim 6.

10. A non-transitory computer-readable storage medium having stored thereon computer instructions, wherein the computer instructions are used to cause the computer to implement the method of claim 6.

11. A cloud code development method, which is applied in a cloud server, which is a digital computer or a mobile apparatus, comprising:
   receiving a code synchronized by a Remote-Server included in a client through stream synchronization;
   establishing a coding virtual machine corresponding to the Remote-Server;
   writing the code synchronized by the Remote-Server through stream synchronization into the coding virtual machine; and
   running the code via the coding virtual machine to generate a corresponding task, wherein the task comprises at least one of code jump, code auto-completion, code hover prompts, which are advanced function tasks of an Integrated Development Environment (IDE);
   wherein the method further comprises:
      adding, via the coding virtual machine, a task notification of the task to a notification queue such that an Agent included in the client pulls the task notification from the notification queue of the coding virtual machine, pulls the task from the coding virtual machine based on the task notification, and sends the task to the Remote-Server included in the client; obtains a task execution status of the Remote-Server, and sends the task execution status to the coding virtual machine; and
      updating, via the coding virtual machine, the task in the coding virtual machine based on the task execution status sent by the client.

12. The method according to claim 11, wherein writing the code synchronized through the stream synchronization into the coding virtual machine, comprises:
   inputting the received code into a master pseudo terminal of the coding virtual machine, blocking a file descriptor of the master pseudo terminal, mapping the code to a slave pseudo terminal by the master pseudo terminal, and inputting the code into a command processor of the coding virtual machine by the slave pseudo terminal.

13. The method according to claim 11, wherein the method further comprises:
   sending, via the coding virtual machine, response information to a client by responding to a heartbeat request sent by the client; and
   restoring the coding virtual machine in response to recovery information representing restoration of the coding virtual machine.

* * * * *